United States Patent [19]

Senft

[11] 4,339,960

[45] Jul. 20, 1982

[54] DRIVE MECHANISM FOR STIRLING ENGINE DISPLACER AND PISTON AND OTHER RECIPROCATING BODIES

[75] Inventor: James R. Senft, Athens, Ohio

[73] Assignee: Sunpower, Inc., Athens, Ohio

[21] Appl. No.: 164,823

[22] Filed: Jun. 30, 1980

[51] Int. Cl.³ .......................... F02G 1/06; F16H 21/18
[52] U.S. Cl. ............................................ 74/50; 60/518
[58] Field of Search ................ 60/518; 74/49, 50, 55, 74/104, 828, 831, 838; 292/37

[56] References Cited

U.S. PATENT DOCUMENTS

| | | | |
|---|---|---|---|
| 241,714 | 5/1881 | Pettibone | 74/50 |
| 288,007 | 11/1883 | Calver | 74/50 |
| 451,283 | 4/1891 | Webb | 81/128 |
| 1,508,614 | 9/1924 | Powell | 74/50 |
| 1,601,655 | 9/1926 | Taylor | 74/55 |
| 2,277,231 | 3/1942 | Ilieff | 292/37 |
| 3,142,852 | 8/1964 | Phaneuf et al. | 74/50 |
| 3,534,621 | 10/1970 | D'Ascenzo | 74/110 |
| 4,074,530 | 2/1978 | Polster | 60/518 |

FOREIGN PATENT DOCUMENTS

| | | | |
|---|---|---|---|
| 712784 | 7/1965 | Canada | 74/828 |
| 26656 | 4/1884 | Fed. Rep. of Germany | 60/518 |
| 384918 | 5/1924 | Fed. Rep. of Germany | 74/104 |
| 1027307 | 5/1953 | France | 92/13.7 |
| 22762 | of 1910 | United Kingdom | 74/838 |

Primary Examiner—Lawrence J. Staab
Attorney, Agent, or Firm—Frank H. Foster

[57] ABSTRACT

A drive mechanism is disclosed for drivingly connecting two reciprocating bodies to a rotating body and is particularly useful for linking a single pin crank of a crank-type Stirling engine to its displacer and power piston. The drive means has at least two slotted yokes, each connected to a different one of the reciprocating bodies such as the pistons of the Stirling engine. The pin of the crank extends through the slots of both slotted yokes. The slots are transverse to each other and preferably are linear.

11 Claims, 11 Drawing Figures

DRIVE MECHANISM FOR STIRLING ENGINE DISPLACER AND PISTON AND OTHER RECIPROCATING BODIES

TECHNICAL FIELD

This invention relates generally to drive or linking mechanisms for drivingly connecting a body having a rotary motion to a body having a reciprocating motion and more particularly relates to a drive mechanism for the displacer and piston of a crank-type Stirling engine or heat pump.

BACKGROUND ART

In crank-type Stirling engines, a piston and a displacer are linked to a rotating shaft by means of a linking mechanism so that the shaft is driven in rotation by the reciprocation of the piston and the displacer is driven in reciprocation by the rotation of the crank shaft. In such an engine both the piston and the displacer have periodic, reciprocating motions which are approximately sinusoidal. They have the same period and a selected phase angle between their respective periodic motions. The operating characteristics of the engine are in part dependent upon the stroke of each as well as the magnitude of the phase angle between their periodic motions.

A variety of linking means for drivingly connecting reciprocating bodies to rotating bodies are shown in the prior art. Those which have been applied in Stirling engines include not only the conventional crank and connecting rod but also rhombic drives, bell cranks, cams and wobble plates.

Slotted yoke drives have long been known in the art and include both the simple slotted yoke in which a pin or roller operates in a slot and the scotch yoke in which wear is reduced through the use of a slide operating in the slot to which the crank pin is rotatably mounted. However, these prior art slotted yokes have the slot essentially perpendicular to the axis of motion of the yoke.

A few patents such as U.S. Pat. No. 3,152,272, show a single yoke with a slot which is inclined to the axis of the reciprocating motion. This is done, however, for reducing friction and has nothing to do with accomplishing a phase relationship between two reciprocating bodies.

One patent, U.S. Pat. No. 963,449, shows a pair of yokes with slots which are essentially perpendicular to the axis of motion of the yokes but which have an intermediate transition area in which a small portion of the slots are inclined to the axis of reciprocating motion. This would not be suitable for Stirling engine applications because of the simultaneous and lengthy dwell and the abrupt changes in the slots.

BRIEF DESCRIPTION OF THE INVENTION

The present invention is a new drive or linking means for drivingly connecting two reciprocating bodies to a single crank or its equivalent so that the bodies have periodic motion of the same period as the crank but have a selected phase angle between their periodic motions.

The invention includes at least two slotted yokes, each connected to a different one of the bodies and having the crank pin extending through their slots. The slots are transverse to each other.

In a Stirling engine embodying the present invention, one slotted yoke is connected to the displacer and the other is connected to the piston. The slot of one yoke is transverse to the slot of the other yoke.

One advantage of the present invention is that a single crank pin can control the motion of both reciprocating bodies allowing for a simplier, substantially less expensive and lighter weight machine having substantially fewer parts.

Another advantage is that the engine can be made more compact and the slots, which are inclined to the axis of reciprocation, amplify the stroke in the sense that the stroke is more than twice the crank throw.

Yet another advantage of the present invention is that it provides pure sinusoidal motion for the displacer and piston. This results in improved balance and less vibration because the pure sinusoidal nature of the reciprocating bodies results in the substantial absence of higher order harmonics above the fundamental frequency of the reciprocating bodies.

Still another advantage of the present invention is that the phase and the amplitude or stroke of both the piston and the displacer may easily be selected at the design stage for a fixed phase and amplitude relationship or in an alternative embodiment can be adjusted either while the machine is stopped or while the machine is running.

BRIEF DESCRIPTION OF THE DRAWINGS

FIG. 2 is a side view of the embodiment illustrated in FIG. 1.

DESCRIPTION OF THE PREFERRED EMBODIMENT

Figure 1:
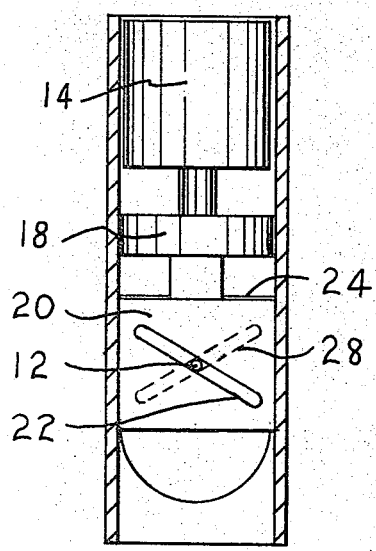
FIGS. 1 through 5 are diagrammatic views illustrating the operation of an embodiment of the invention.
Figure 2:
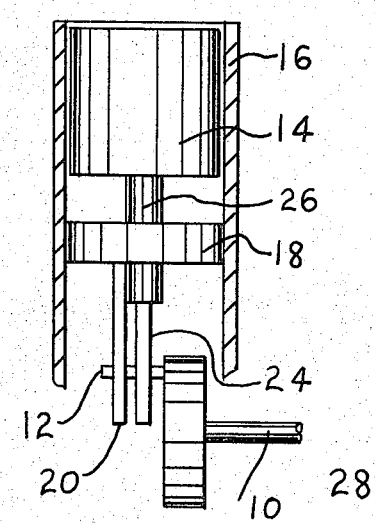
Figure 3:
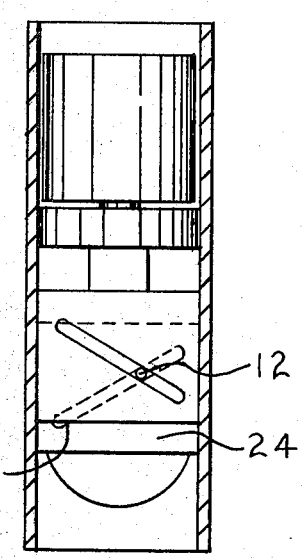
Figure 4:
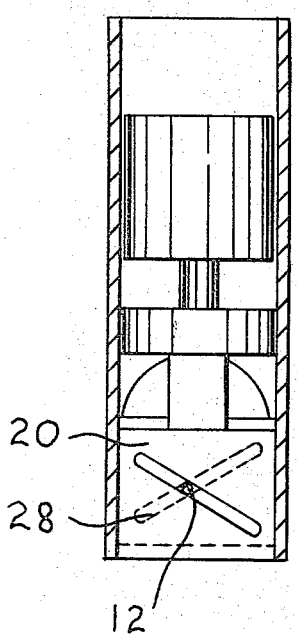
Figure 5:
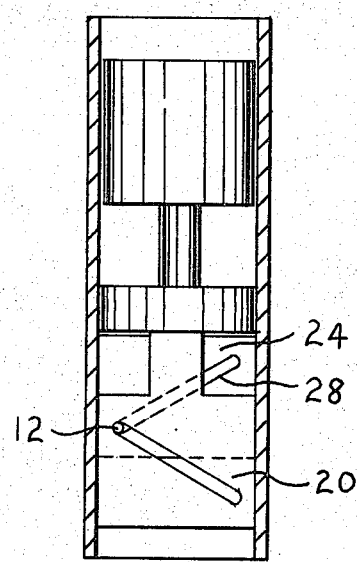

FIGS. 1-5 illustrate a Stirling engine which has a crank shaft 10 with a crank pin 12. The engine also has a displacer 14 and a power piston 18 both reciprocatingly mounted in the same cylinder housing. The figures are very diagrammatic to illustrate the principles of the invention and details of known Stirling engine structure are not shown.

A first slotted yoke 20 is connected to the piston 18 and is provided with a slot 22. The slot 22 is linear and is inclined to the axis of reciprocation of the piston 18.

The crank pin 12 extends through the slot 22 so that it can slide between opposite ends of the slot 22. A second slotted yoke 24 is connected to the displacer connecting rod 26 and is also provided with a slot 28. The crank pin 12 also extends through the slot 28.

The two slots 22 and 28 are transverse to each other and are both linear. In the embodiment illustrated in FIGS. 1-5 both slots are inclined to the axis of the reciprocation by the same angle.

The operation of the embodiments of FIGS. 1-5 is illustrated in sequence in FIGS. 1, 3, 4 and 5. As the crank pin 12 moves in the clockwise direction in these figures beginning with FIG. 1, the pistons reciprocate, each in accordance with its own slotted yoke. Their motions are purely sinusoidal separated by a phase angle.

Figure 6:
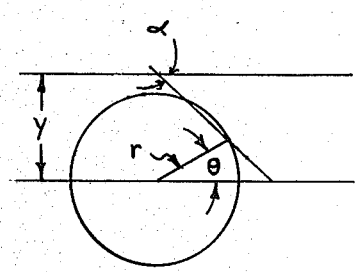
FIG. 6 is a geometric diagram illustrating the mathematical and geometrical relationships in the embodiment illustrated in FIGS. 1-5.

Referring to FIG. 6, when the slots of the yokes are formed so they are both inclined to a line normal to the axis of reciprocation by angle α, then the motion of the piston is described by the equation:

$$y = \frac{r \sin(\theta + \alpha)}{\cos\alpha} \qquad \text{EQ. I}$$

where $\theta$ is the angular position of the crank pin and r is the crank radius.

Thus, with such an embodiment of the invention, the phase relationship between the piston and the crankshaft is equal to the angle α with the crankshaft lagging the piston by α. Similarly, the crankshaft will lead the displacer by α so that the phase difference between the displacer and piston is 2α.

Furthermore, the stroke with the slotted yokes is amplified by the factor 1/cosα to give a stroke of 2r/cosα.

Figure 7:
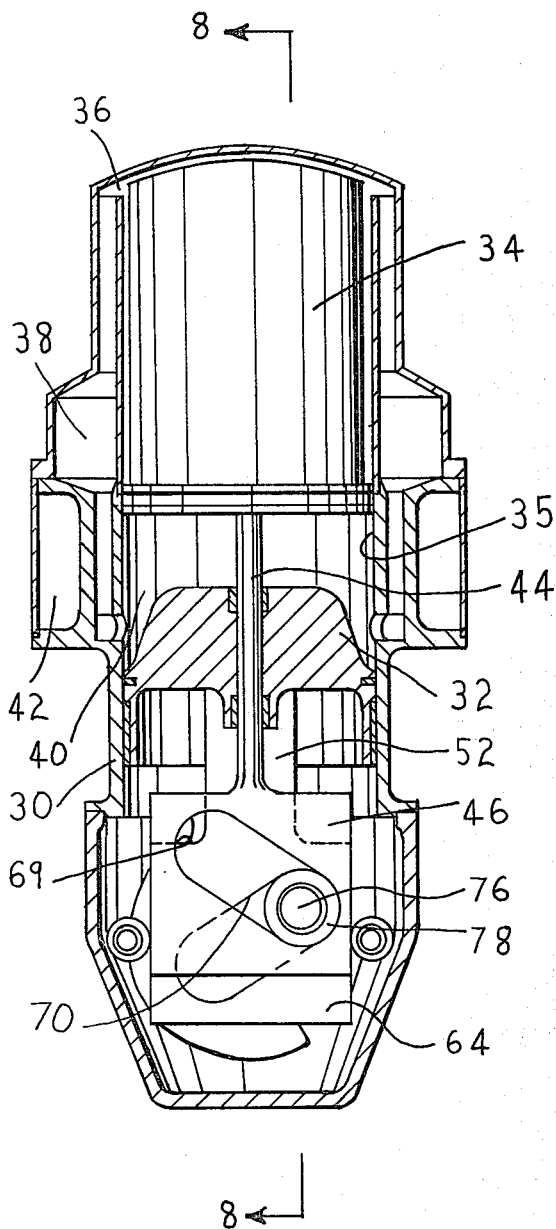
FIG. 7 is a front view in vertical section of the preferred embodiment of the invention.
Figure 8:
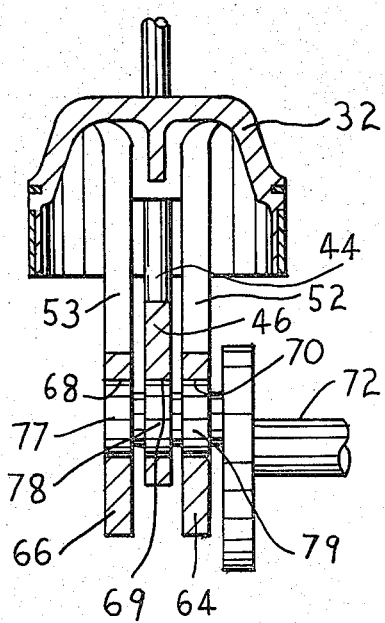
FIG. 8 is a partial side view in vertical section of the embodiment illustrated in FIG. 7 taken substantially along the line 8—8 of FIG. 7.

Referring now to FIGS. 7 and 8, the illustrated engine comprises a cylinder housing 30 in which a power piston 32 and displacer 34 are mounted for reciprocation in a cylinder 35. The hot space 36 is connected through a regenerator 38 to a cool space 40 which is surrounded by a cooling jacket 42.

The displacer 34 has a displacer rod 44 extending axially, downwardly to connection with a first slotted yoke 46.

A pair of arms 52 and 53 are connected to the power piston 32 and extend downward from it to a pair of identical yokes 64 and 66. The yokes 64 and 66 are identical and are functionally equivalent to a single yoke. Two yokes are used for the purpose of balancing the loading from the piston to the yokes 64 and 66.

The crank 72 has a crank pin 76 which extends through all three yokes and has three sealed, permanently lubricated bearings 77, 78 and 79 for operating within the yoke slots 68, 69 and 70 of the yokes.

Figure 9:
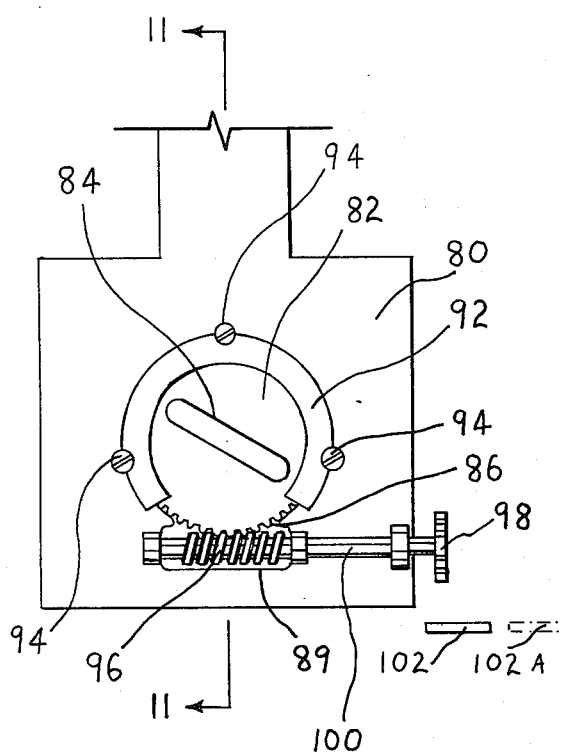
FIG. 9 is a front view of an adjustable yoke for use in alternative embodiments of the invention.
Figure 10:
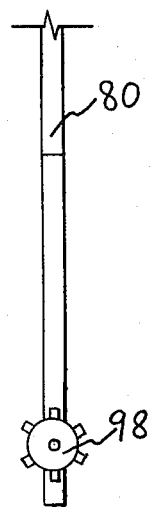
FIG. 10 is an end view of the embodiment of FIG. 9.
Figure 11:
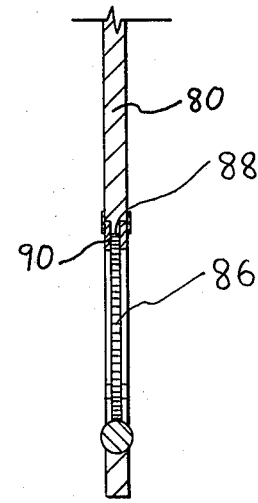
FIG. 11 is a view in vertical section taken along the line 11—11 of FIG. 9.

FIGS. 9, 10 and 11 illustrate an alternative embodiment of the invention which is constructed so that the angle of inclination of the slots is adjustable. One of these adjustable slot yokes may be used with a fixed slot yoke or all the yokes may be adjustable.

The phase difference between the displacer and the piston is the algebraic difference between the angular orientation of the two slots measured with reference to a line normal to the axis of reciprocation. For example, if the slots of FIG. 1 were at different angular orientations $\alpha_1$ and $-\alpha_2$, then the phase difference between the motion of the displacer and the piston would be $\alpha_1 + \alpha_2$.

The adjustable slot mechanism has a main yoke support frame 80 with a circular slot member 82 mounted to the support frame 80 so that it may be pivoted in angular adjustment with respect to the yoke support frame 80. The slot 84 is formed in the slot member 82.

The preferred slot member 82 is a wheel having gear teeth 86 formed about its periphery. The yoke support frame 80 has an opening 89 formed with an inwardly opening, annular slot 88 for receiving the wheel 82. The annular slot 88 may be formed as illustrated with an annular shoulder 90 formed on the support frame 80 and an arcuate insert 92 which seats against the annular shoulder 90 and is held in position by fasteners 94.

The opening 89 extends downwardly to receive a worm gear 96 which is journalled to the support frame 80 and has its worm teeth meshed with the peripheral gear teeth 86 of the slot member 82. The worm gear provides a means for adjusting the angle of the slot 84 and for releasably retaining the slot 84 at the selected position of angular adjustment.

A star wheel 98 having outwardly extending peripheral protrusions is attached to the worm gear 96 by a shaft 100. A moveable finger 102 is extendable into the path of the protrusions on the star wheel for engaging the protrusions and indexing the star wheel by an angle during each stroke of the slotted yoke. The finger 102 is withdrawable to a position 102a to halt any adjustment in the slot angle so that it remains as adjusted.

The finger 102 not only is slideable along its axis but also is pivotable in one direction from the position illustrated about an axis which is perpendicular to its longitudinal axis and perpendicular to a plane which includes the path of the star wheel 98 during reciprocation. The worm gear is provided with some friction drag so that the finger 102 will stay rigid and index the star wheel 98 for one direction of reciprocation and will merely pivot without indexing for the other direction. The slot is adjusted in the opposite direction by rotating the finger 102 about its longitudinal axis by 180°.

In operation, so long as the pin 98 is protruding into the path of the protrusions on the star wheel, then each stroke causes an indexing rotation of the star wheel and therefore of the worm gear. Each such indexing results in some angular rotation of the slot member 82 and therefore repositioning of the slot at a different angular orientation. In this manner the slot may be varied during operation of the machine. Alternatively, of course, the slot may be adjusted while the machine is stopped by merely grasping the star wheel 98 and rotating it to the desired position.

Adjustment of the angle of orientation of the slot also modifies or changes the stroke in addition to changing the relative phase angle. This is in accordance with EQ. 1. In order to be able to adjust the phase angle and the stroke to independent values, the crank pin 12, illustrated in FIGS. 1-5, may be radially adjustable in a manner which is well known in the prior art of cranks.

I claim:

1. A multiple yoke for drivingly linking a rotatable crank to two different reciprocating bodies which reciprocate along parallel axes so that said crank and said bodies all have periodic motion having the same period, said bodies having a selected phase angle between their respective periodic motions, said drive comprising:
   at least two slotted yokes, each connected to a different one of said bodies and having the pin of said crank extending through their slots, said slots being transverse to each other along their entire length.

2. A multiple yoke for drivingly linking a rotatable crank to two different reciprocating bodies so that said crank and said bodies all have periodic motion having the same period, said bodies having a selected phase angle between their respective periodic motions, said drive comprising:
   at least two slotted yokes, each connected to a different one of said bodies and having the pin of said crank extending through their slots, said slots being transverse to each other along their entire length at least one of said yokes having a portion including said slot which is angularly adjustable for adjustably selecting the relative angular orientation of said slots for adjusting the phase angle between the motion of said bodies.

3. A yoke drive in accordance with claim 1 wherein both of said slots are linear.

4. A multiple yoke for drivingly linking a rotatable crank to two different reciprocating bodies so that said crank and said bodies all have periodic motion having the same period, said bodies having a selected phase angle between their respective periodic motions, said drive comprising:

at least two slotted yokes, each connected to a different one of said bodies and having the pin of said crank extending through their slots, said slots being linear and transverse to each other along their entire length at least one of said yokes having an adjustable portion which includes said slot and is angularly adjustable for variably selecting the relative angular orientation of said slots for adjusting the phase angle between the periodic motion of said bodies.

5. A Stirling machine including:
(a) a crank shaft journalled to a housing and having at least one crank pin;
(b) a displacer reciprocatingly mounted in said housing;
(c) a first slotted yoke connected to said displacer and having said crank pin in its slot;
(d) a piston reciprocatingly mounted in said housing for reciprocating along an axis parallel to the axis of reciprocation of said displacer; and
(e) a second slotted yoke connected to said piston and having said crank pin in its slot, the slot of said second yoke being transverse to the slot in said first yoke.

6. A Stirling machine in accordance with claim 5 wherein both of said slots are linear.

7. A Stirling machine including:
(a) a crank shaft journalled to a housing and having at least one crank pin;
(b) a displacer reciprocatingly mounted in said housing;
(c) a first slotted yoke connected to said displacer and having a linear slot with said crank pin in its slot;
(d) a piston reciprocatingly mounted in said housing; and
(e) a second slotted yoke connected to said piston and having a linear slot with said crank pin in its slot, the slot of said second yoke being transverse to the slot in said first yoke wherein at least one of said yokes has a portion including said slot which is angularly adjustable for adjustably selecting the relative angular orientation of said slots for adjusting the phase angle between the motion of said bodies.

8. A Stirling machine in accordance with claim 5 wherein at least one of said yokes has a portion including said slot which is angularly adjustable for adjustably selecting the relative angular orientation of said slots for adjusting the phase angle between the motion of said bodies.

9. A machine in accordance with claim 8 wherein said adjustable yoke more particularly comprises:
(a) a main yoke support frame;
(b) a slot member angularly adjustably mounted to said support frame and having said slot formed therein; and
(c) means for releasably retaining said slot member at a selected position of angular adjustment.

10. A machine in accordance with claim 9 wherein said slot member is a wheel having gear teeth formed about its periphery, said support frame has an inwardly opening annular slot for receiving said wheel in said yoke support frame and wherein said means for retaining said wheel comprises a worm gear rotatably mounted to said support frame and meshed with said peripheral gear teeth.

11. A machine in accordance with claim 10 and further comprising:
(a) a star wheel attached to said worm gear and having outward peripheral positions; and
(b) a moveable finger extendable into the path of the said protrusions for engaging a protrusion and indexing said star wheel.

* * * * *